(12) United States Patent
Nicholson et al.

(10) Patent No.: US 11,977,676 B2
(45) Date of Patent: May 7, 2024

(54) ADJUSTING CONTENT OF A HEAD MOUNTED DISPLAY

(71) Applicant: Lenovo (Singapore) PTE. LTD., New Tech Park (SG)

(72) Inventors: John W. Nicholson, Cary, NC (US); Daryl C. Cromer, Raleigh, NC (US); Howard Locker, Cary, NC (US); Mengnan Wang, Chapel Hill, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/369,314

(22) Filed: Jul. 7, 2021

(65) Prior Publication Data
US 2023/0008009 A1    Jan. 12, 2023

(51) Int. Cl.
*G06F 3/01* (2006.01)
(52) U.S. Cl.
CPC .................................. *G06F 3/013* (2013.01)
(58) Field of Classification Search
CPC . G06F 3/013; G06F 3/011; G02B 2027/0187; G02B 27/0093; G02B 27/0172
See application file for complete search history.

(56) References Cited

U.S. PATENT DOCUMENTS

| | | | | |
|---|---|---|---|---|
| 10,845,595 | B1* | 11/2020 | Sohn | G02B 27/0093 |
| 11,269,402 | B1* | 3/2022 | Canberk | G06F 3/011 |
| 2014/0247286 | A1* | 9/2014 | Chi | G09G 3/003 |
| | | | | 345/672 |
| 2017/0315612 | A1* | 11/2017 | Shanware | G06F 3/012 |
| 2017/0354883 | A1* | 12/2017 | Benedetto | G06T 19/20 |
| 2018/0196505 | A1* | 7/2018 | Nishizawa | G06F 3/013 |

* cited by examiner

*Primary Examiner* — Matthew A Eason
*Assistant Examiner* — Chayce R Bibbee
(74) *Attorney, Agent, or Firm* — Kunzler Bean & Adamson

(57) ABSTRACT

Apparatuses, methods, systems, and program products are disclosed for adjusting content of a head mounted display. An apparatus includes a processor and a memory that stores code executable by the processor to determine a field of view for a user relative to a display of a head-mounted display unit, detect that the user is attempting to look at content that is presented on the display of the head-mounted display unit but is out of the user's field of view, and adjust the content that is out of the user's field of view to make the content visible to the user.

20 Claims, 6 Drawing Sheets

ADJUSTING CONTENT OF A HEAD MOUNTED DISPLAY

FIELD

The subject matter disclosed herein relates to head mounted display units and more particularly relates to adjusting content presented on a display of the head mounted display unit.

BACKGROUND

Head mounted displays or headsets may include a display that can be used for viewing augmented or virtual reality environments. Typically, these systems operate based on registering the wearer's eyes in a known location relative to the display. An incorrect or erroneous registration, however, may impact which content is visible to the user.

BRIEF SUMMARY

Apparatuses, methods, systems, and program products are disclosed for adjusting content of a head mounted display. An apparatus, in one embodiment, includes a processor and a memory that stores code executable by the processor to determine a field of view for a user relative to a display of a head-mounted display unit, detect that the user is attempting to look at content that is presented on the display of the head-mounted display unit but is out of the user's field of view, and adjust the content that is out of the user's field of view to make the content visible to the user.

A method for adjusting content of a head mounted display, in one embodiment, includes determining, by a processor, a field of view for a user relative to a display of a head-mounted display unit, detecting that the user is attempting to look at content that is presented on the display of the head-mounted display unit but is out of the user's field of view, and adjusting the content that is out of the user's field of view to make the content visible to the user.

A program product for adjusting content of a head mounted display, in one embodiment, includes computer readable storage medium that stores code executable by a processor. In one embodiment, the code is executable by the processor to determine a field of view for a user relative to a display of a head-mounted display unit, detect that the user is attempting to look at content that is presented on the display of the head-mounted display unit but is out of the user's field of view, and adjust the content that is out of the user's field of view to make the content visible to the user.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
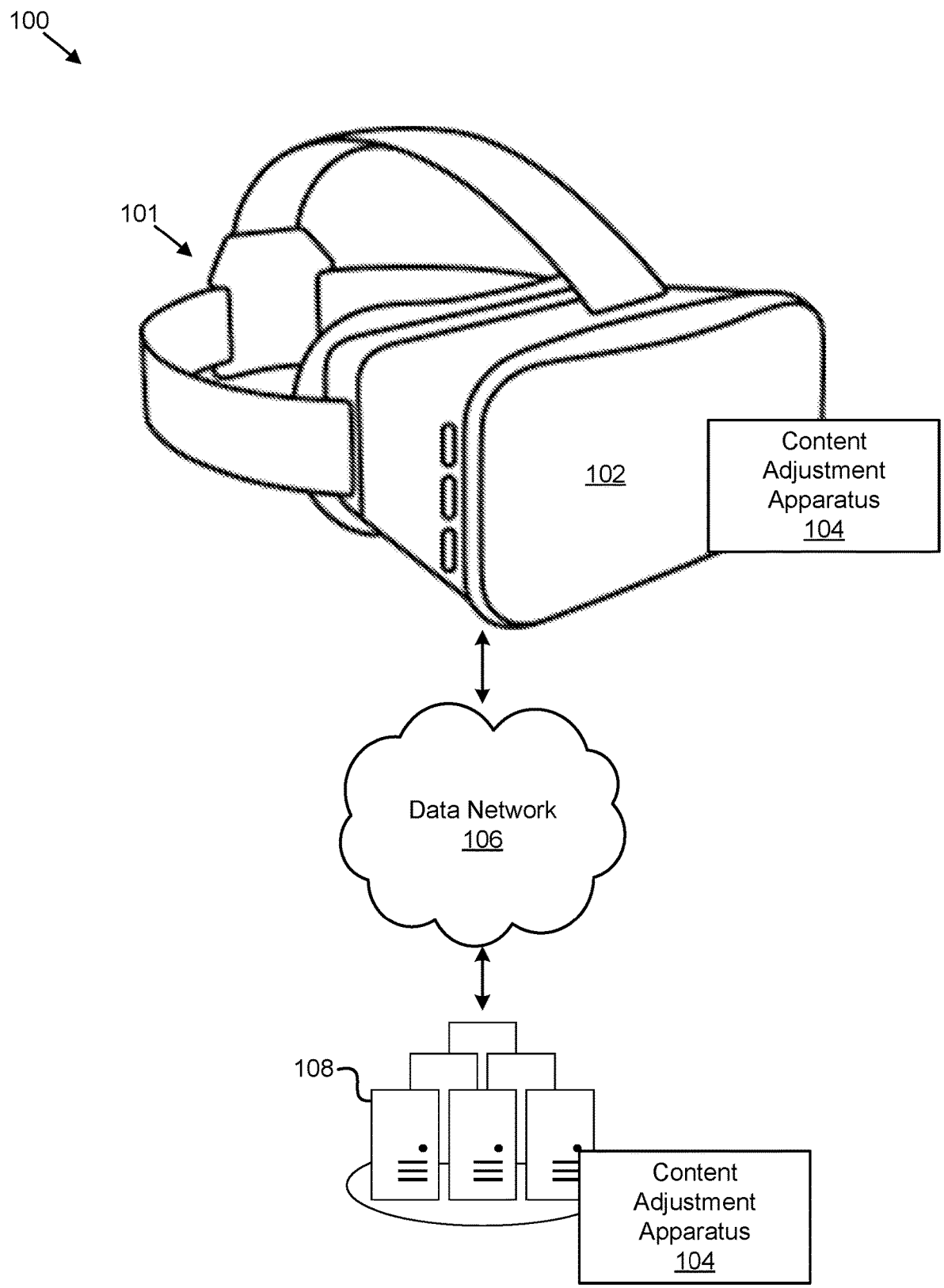
FIG. 1 is a schematic block diagram illustrating one embodiment of a system for adjusting content of a head mounted display.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to emphasize their implementation independence more particularly. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Apparatuses, methods, systems, and program products are disclosed for adjusting content of a head mounted display. An apparatus, in one embodiment, includes a processor and a memory that stores code executable by the processor to determine a field of view for a user relative to a display of a head-mounted display unit, detect that the user is attempting to look at content that is presented on the display of the head-mounted display unit but is out of the user's field of view, and adjust the content that is out of the user's field of view to make the content visible to the user.

In one embodiment, the code is executable by the processor to detect that the user is attempting to look at content that is not within the user's field of view by detecting eye movement within an eye-box defined for the head-mounted display unit directed towards the content.

In certain embodiments, the code is executable by the processor to detect the eye movement within the eye-box based on input from a camera mounted on the head-mounted display and pointed towards the user's eyes. In various embodiments, the code is executable by the processor to detect the eye movement within the eye-box based on input from a distance sensor mounted on the head-mounted display and pointed towards the user's eyes.

In one embodiment, the code is executable by the processor to detect the eye movement within the eye-box in response to detecting that the user is manually adjusting a position of the head-mounted display unit on the user's head. In some embodiments, the code is executable by the processor to detect that the user is attempting to look at content that is not within the user's field of view by detecting that the user is looking in a direction of the content and detecting that the user is moving the head-mounted display unit in a same direction.

In one embodiment, adjusting the content comprises moving the content into the user's field of view on the display. In some embodiments, adjusting the content comprises resizing the content to be at least one of larger to make the content visible within the user's field of view and smaller to avoid the content overlapping with other content presented on the display.

In various embodiments, adjusting the content comprises adjusting a viewport for the display of the head-mounted display unit until the content that is out of the user's field of view is within the user's field of view. In some embodiments, the content that is out of the user's field of view comprises tag-along content that is intended to remain within the user's field of view. In certain embodiments, the code is further executable by the processor to trigger re-calibrating the user's field of view relative to the display of the head-mounted display unit in response to detecting that the user is attempting to look at the content that is out of the user's field of view.

A method for adjusting content of a head mounted display, in one embodiment, includes determining, by a processor, a field of view for a user relative to a display of a head-mounted display unit, detecting that the user is attempting to look at content that is presented on the display of the head-mounted display unit but is out of the user's field of view, and adjusting the content that is out of the user's field of view to make the content visible to the user.

In one embodiment, detecting that the user is attempting to look at content that is not within the user's field of view comprises detecting eye movement within an eye-box defined for the head-mounted display unit directed towards the content. In certain embodiments, the method includes detecting the eye movement within the eye-box based on input from a camera mounted on the head-mounted display and pointed towards the user's eyes.

In some embodiments, the method includes detecting the eye movement within the eye-box based on input from a distance sensor mounted on the head-mounted display and pointed towards the user's eyes. In one embodiment, the method includes detecting the eye movement within the eye-box in response to detecting that the user is manually adjusting a position of the head-mounted display unit on the user's head.

In certain embodiments, adjusting the content comprises moving the content into the user's field of view on the display. In some embodiments, adjusting the content comprises resizing the content to be at least one of larger to make the content visible within the user's field of view and smaller to avoid the content overlapping with other content presented on the display. In various embodiments, adjusting the content comprises adjusting a viewport for the display of the head-mounted display unit until the content that is out of the user's field of view is within the user's field of view.

A program product for adjusting content of a head mounted display, in one embodiment, includes computer readable storage medium that stores code executable by a processor. In one embodiment, the code is executable by the processor to determine a field of view for a user relative to a display of a head-mounted display unit, detect that the user is attempting to look at content that is presented on the display of the head-mounted display unit but is out of the user's field of view, and adjust the content that is out of the user's field of view to make the content visible to the user.

Head mounted display units and/or headsets may be used for presenting augmented reality and/or virtual reality environments and may operate based on having the wearer's eyes in a known or registered location relative to the display screen. The eye-box is the term used to describe a rectangle in space where the display of the headset is visible. Different optical systems can have larger or smaller eye-boxes.

Registration of the headset to the user's eye might be done through physical adjustments such as knobs, or software mechanisms similar to keystone settings on a projector. Sometimes the registration is not perfect, exact, or accurate (e.g., perhaps the user rushed through or skipped the registration), so part of the display is not visible when the eye is in one position. Additionally, head mounted display units are known to be heavy and lack a well-balanced weight distribution, which may result in the head mounted display unit sliding down the user's face or the user constantly moving the head mounted display unit around to reduce pressure on the nose, ears, back of head, or the like. In these cases, the user may need to move their eye within the eye-box to see certain parts of the display. This kind of motion may be accomplished by moving, holding, readjusting, or the like the head mounted display unit on the user's head.

There are typically two types of augmented reality and virtual reality content. One type, sometimes called "tag-along" content, stays in the display all the time, perhaps at a fixed pixel position on the display, or perhaps animated with a kind of rubber-banding effect but still remaining in the user's view. The other type, sometimes called "pinned" content, is fixed to a position in a three-dimensional space (either the real world or a virtual world), and the head mounted display unit tracking system may be used to determine whether and where to display this content on the display.

Pinned content does not suffer from the eye-box problem described above—the wearer can just move their head a little bit more to see the content. Tag-along content, on the other hand, remains in the same place on the display even as the user looks around. Thus, to make the tag-along content visible, the user needs to move the position of their eye in the eye-box. The subject matter described herein provides various solutions for the foregoing issues.

FIG. 1 is a schematic block diagram illustrating one embodiment of a system for adjusting content of a head mounted display. In one embodiment, the system 100 includes a head mounted display ("HMD") unit 101. As used herein, an HMD unit 101 may refer to a display device that is worn on a user's head and has a display positioned in front of the user's eyes. A typical HMD unit 101 has one or two displays 102, with lenses and semi-transparent mirrors embedded in eyeglasses (also termed data glasses), a visor, or a helmet. The displays 102 may be miniaturized and may include cathode ray tubes ("CRT"), liquid crystal displays ("LCDs"), liquid crystal on silicon ("LCos"), or organic light-emitting diodes ("OLED").

In certain embodiments, the HMD unit 101 may be configured to mount, hold, or otherwise couple to a smart phone, which becomes the computing device and display for the HMD unit 101. In such an embodiment, the smart phone, or other mobile device, may be operably coupled to the HMD unit 101 to enable a user to interact with the smart phone, receive data from the HMD unit 101, turn on/off using controls on the HMD unit 101, and/or the like. Otherwise, the display and computing device is integrated into the HMD unit 101 to form a single unit. The computing device may comprise various processors or processor cores, memory, storage, network connectivity chips, graphics chips, audio chips, and/or the like.

The HMD unit 101 may be configured to present a virtual reality or augmented reality environment. As used herein, a virtual reality ("VR") environment is an interactive, virtual, digital, or otherwise computer generated three-dimensional environment or simulation. An augmented reality ("AR") environment may be considered a form of virtual reality that layers virtual information over a camera feed into an HMD unit 101 or through a smartphone or tablet or other device coupled to the HMD unit 101 giving the user the ability to view three-dimensional images.

In one embodiment, the HMD unit 102 is coupled to a headband 104 that is configured to go over/around the user's head and hold the HMD unit 102 against the user's eyes/face. As shown in FIG. 1, the headband 104 may encompass the user's head using different bands. In certain embodiments, a single headband 104 that goes around the user's head may be used, or other bands that go over the user's head may be used to add additional support for the HMD unit 102. Other embodiments may include arms, similar to arms for eyeglasses, that sit on the user's ears, a chin strap for securing the HMD unit 102 to the user's head, a helmet that totally encloses the user's head, a visor, and/or the like.

In one embodiment, the system 100 includes a content adjustment apparatus 104. In general, the content adjustment apparatus 104 is configured to dynamically adjust content presented on the display 102 of the HMD unit 101 that may be out of the user's field of view, e.g., out of a defined "eyebox" for the user. In one embodiment, the content adjustment apparatus 104 determines a field of view for a user relative to a display of a head-mounted display unit, detects that the user is attempting to look at content that is presented on the display of the head-mounted display unit but is out of the user's field of view, and adjusts the content that is out of the user's field of view to make the content visible to the user. The content adjustment apparatus 104 is described in more detail below with reference to FIGS. 2 and 3.

In certain embodiments, the content adjustment apparatus 104 may include a hardware device such as a secure hardware dongle or other hardware appliance device (e.g., a set-top box, a network appliance, or the like) that attaches to a device such as the HMD unit 101, a laptop computer, a server 108, a tablet computer, a smart phone, a security system, a network router or switch, or the like, either by a wired connection (e.g., a universal serial bus ("USB") connection or other communication bus that is physically attached to the device) or a wireless connection (e.g., Bluetooth®, Wi-Fi, WAN, or the like); that attaches to an electronic display device (e.g., a television or monitor using an HDMI port, a DisplayPort port, a Mini DisplayPort port, VGA port, DVI port, or the like); and/or the like. A hardware appliance of the content adjustment apparatus 104 may include a power interface, a wired and/or wireless network interface, a graphical interface that attaches to a display, and/or a semiconductor integrated circuit device as described below, configured to perform the functions described herein with regard to the content adjustment apparatus 104.

The content adjustment apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the content adjustment apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the content adjustment apparatus 104.

The semiconductor integrated circuit device or other hardware appliance of the content adjustment apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the content adjustment apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

In embodiments where the wireless connection is a mobile telephone/cellular network, the network may be configured as a 4G network, a 5G network, a long-term evolution ("LTE") based network, and/or the like. In such an embodiment, the mobile telephone network may create and manage wireless connections between base access units for the network and user equipment ("UE") devices for the user. The wireless connection may also employ a Wi-Fi network based on any one of the Institute of Electrical and Electronics Engineers ("IEEE") 802.11 standards.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The servers 108 may store, transmit, and/or the like content to be presented on the HMD unit, such as AR or VR content.

Figure 2:
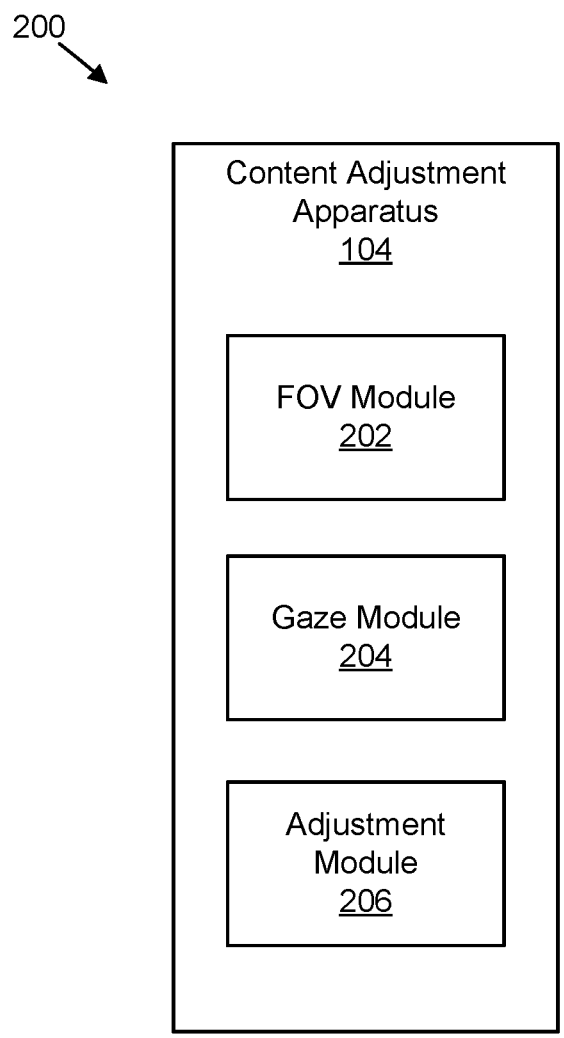
FIG. 2 is a schematic block diagram illustrating one embodiment of an apparatus for adjusting content of a head mounted display.

FIG. 2 is a schematic block diagram illustrating one embodiment of an apparatus 200 for adjusting content of a head mounted display. In one embodiment, the apparatus 200 includes an instance of a content adjustment apparatus 104. The content adjustment apparatus 104, in one embodiment, includes one or more of a FOV module 202, a gaze module 204, and an adjustment module 206, which are described in more detail below.

In one embodiment, the FOV module 202 is configured to determine a field of view for a user relative to a display 102 of a head-mounted display unit, such as the HMD unit 101 described above with reference to FIG. 1. As used herein, the user's field of view may comprise the area in front of the user's eyes that is visible to the user. As it relates to the subject matter herein, the user's field of view comprises the area, portion, section, of the like of the display 102 that is visible to the user while the user wears the HMD unit 101.

In one embodiment, the FOV module 202 may use various sensors such as distance sensors, proximity sensors, light sensors, and/or the like to determine a distance between the user's eyes and the display 102 of the HMD unit 101 to derive the horizontal and vertical field of view angles, dimensions, sizes, and/or the like, which may further be based on the size of the display 102. As shown below in FIG. 4, content on the display 102 may be presented within a viewport, which is the viewable area of the display where content is presented. The user's field of view and the viewport may not correspond, however, e.g., due to incorrect calibration, incorrect fit of the HMD unit 101 on the user's head, and/or the like, which may inhibit or prevent the user from viewing all of the available content that is presented on the display. The subject matter herein provides a solution for matching or correcting the user's field of view and/or adjusting the content on the display so that the user can view content which may otherwise be at least partially blocked from the user's field of view.

In one embodiment, the gaze module 204 is configured to detect that the user is attempting to look at content that is presented on the display of the head-mounted display unit but is out of the user's field of view. As explained above, some content may not be completely within the user's field of view or may only be partially visible to the user. In such an embodiment, the user may strain or attempt to look at the content, e.g., looking hard right, left, up, and/or down to view content that is not wholly visible to the user.

In various embodiments, the content may include virtual reality or augmented reality content. The content may be in a fixed location with the virtual/augmented reality environment or may be tag-along content that changes location on the display 102 to follow the user as the user moves his head around within the virtual/augment reality environment.

In one embodiment, the gaze module 204 detects that the user is attempting to look at content that is not within the user's field of view by detecting eye movement within an eye box defined for the HMD unit 101 unit directed towards the content. As used herein, an eye box may refer to a logical, calculated volume or area between the user's eyes and the display 102 within which users can place their eyes to see content presented on the display 102.

In certain embodiments, the gaze module 204 tracks the user's line-of-sight from the user's eyes to the display 102. The gaze module 204, for instance, may use various eye tracking algorithms, image processing algorithms, and/or sensors, e.g., cameras, distance sensors, motion sensors, and/or the like that are mounted to the HMD unit 101 near the display 102 and pointed towards the user's eyes, or the like to detect when a user's moves their eyes, the direction that the user is looking, and a point or area on the display 102 where the user is looking.

In such an embodiment, the gaze module 204, based on the user's determined eye gaze and the calculated eye box, detects that the user is attempting to look at content that is not within the user's field of view by detecting eye movement within an eye-box defined for the HMD unit 101 that is directed towards the content. For instance, if the user's eye gaze indicates that the user is attempting to look at content that is on the far left of the display 102 but may be beyond the boundaries of the eye box, the gaze module 204 may determine that the user is attempting to look at content that is not within the user's field of view.

In one embodiment, the gaze module 204 detects the eye movement within the eye-box in response to detecting that the user is manually adjusting a position of the HMD unit 101 on the user's head. As explained in more detail below, the gaze module 204 and/or the movement module 302 may detect that the user is manually moving the HMD unit 101, e.g., left-to-right, up-to-down, or the like, using various sensors in the HMD unit 101, e.g., accelerometer, gyroscope, and/or the like. In response to the detected movement, the gaze module 204 may track the user's eye gaze to determine whether the user's eye gaze is in the same direction as the HMD unit 101 movement. If so, then the gaze module 204 may determine that the user is trying to view content that is not visible to the user.

In one embodiment, the gaze module 204 detects that the user is attempting to look at content that is not within the user's field of view by detecting that the user is looking in a direction of the content and detecting that the user is moving the HMD unit 101 in a same direction. For instance, the gaze module 204 may detect that the user is looking left and is turning his head left, which moves the HMD unit 101 to the left in the same direction. In one embodiment, the gaze module 204 may determine whether the user's eye gaze meets a predefined threshold the defines how much the user is straining or working to look a certain direction. For instance, if the user is just glancing to the left, then he may not be attempting to look at content that is outside the user's field of view and not wholly visible on the display 102. On the other hand, if the user is looking hard to the left, e.g., as far to the left as his eyes will allow, and the HMD unit 101 is also moving to the left, then the gaze module 204 may determine that the user is trying to view content that is outside not wholly visible on the display 102. As explained above, the gaze module 204 and/or the movement module 302 may detect in which direction the HMD unit 101 is moving based on feedback from various sensors, e.g., accelerometers, gyroscopes, and/or the like.

In one embodiment, the adjustment module 206 is configured to identify content that is outside the user's field of view that the user is attempting to look at, e.g., tag-along content, and dynamically adjust various characteristics of the content, e.g., size, position, or the like, to make the content visible to the user. In certain embodiments, the adjustment module 206 adjusts the content by moving the content into the user's field of view on the display 102. The adjustment module 206, for example, may dynamically move the content that is not within the user's field of view to a different location on the display 102 that is within the user's field of view and that does not block other content of interest on the display, e.g., is not placed right in the user's direct line of sight.

In one embodiment, the adjustment module 206 adjusts the content by resizing the content to be either larger, to make the content visible within the user's field of view, or smaller, to avoid the content overlapping with other content presented on the display. For example, the adjustment module 206 may make a tag-along content element larger on the display 102 so that it comes into the user's field of view and is visible to the user. In some embodiments, if the content overlaps other content presented on the display 102, the adjustment module 206 may make the content smaller so that the content does not overlap other content presented on the display 102.

In one embodiment, the adjustment module 206 adjusts the content comprises by adjusting a viewport for the display of the HMD unit 101 until the content that is out of the user's field of view is within the user's field of view. As used herein, the viewport may refer to the area of the display 102 that presents content, which may not match or correspond to the user's field of view. For instance, the user's field of view may be smaller or may be offset from the viewport so that the entire viewport, e.g., the entire portion of the display 102 that presents content, is not completely visible to the user. In such an embodiment, the adjustment module 206 modifies the dimensions of the viewport so that it matches or corresponds to the user's field of view. The adjustment module 206, for example, may make the viewport smaller in both the horizontal and vertical directions, may only adjust the viewport in one dimension, and/or the like. The adjustment module 206 may similarly adjust a resolution of the display 102, to make content larger or smaller, may adjust a brightness, contrast, or other display setting for the display 102.

Figure 3:
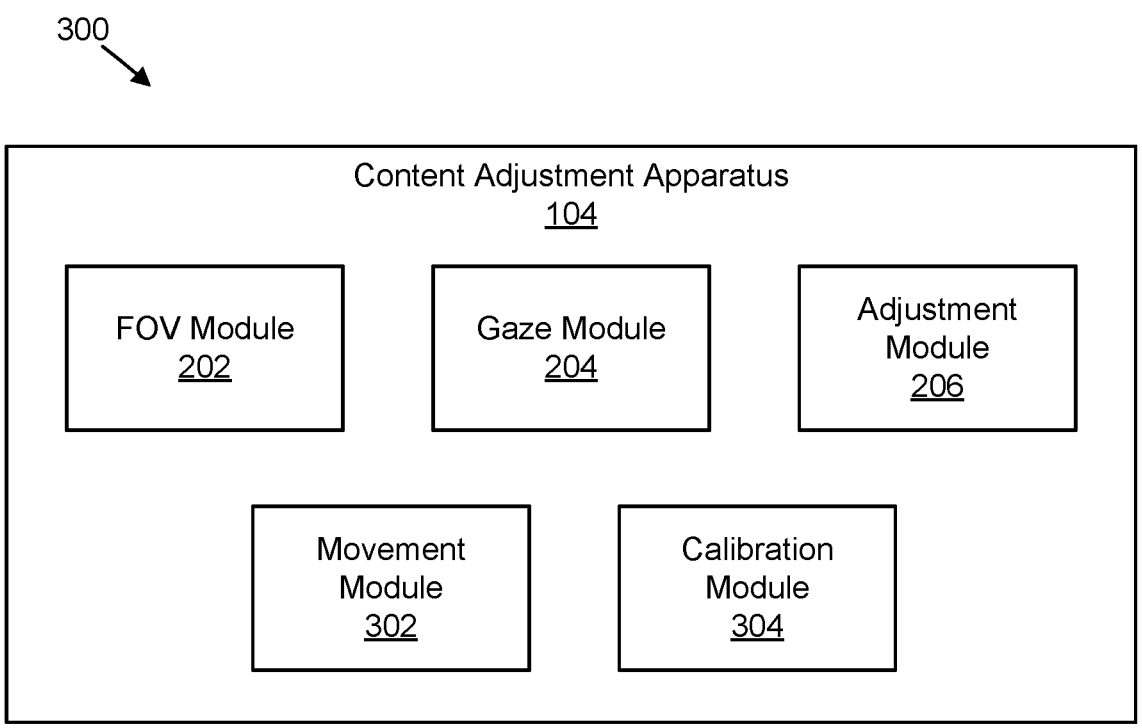
FIG. 3 is a schematic block diagram illustrating one embodiment of another apparatus for adjusting content of a head mounted display.

FIG. 3 is a schematic block diagram illustrating one embodiment of another apparatus 300 for adjusting content of a head mounted display. In one embodiment, the apparatus 300 includes an instance of a content adjustment apparatus 104. The content adjustment apparatus 104, in one embodiment, includes one or more of a FOV module 302, a gaze module 304, and an adjustment module 306, which may be substantially similar to the FOV module 202, the gaze module 204, and the adjustment module 206 described above with reference to FIG. 2. In further embodiments, the content adjustment apparatus 104 includes a movement module 302 and a calibration module 304, which are described in more detail below.

In one embodiment, the movement module 302 is configured to detect that the user is manually adjusting a position of the HMD unit 101 on the user's head. In such an embodiment, the movement module 302 may use various sensor data to determine movement of the HMD unit 101. For instance, the movement module 302 may detect that the user is touching HMD unit 101, e.g., the display portion 102, the headband, and/or the like using various touch sensors. In certain embodiments, the movement module 302 may detect that the user is moving the HMD unit 101 using motion sensors, proximity sensors, accelerometers, gyroscopes, and/or the like that may be integrated into or built into the HMD unit 101. The movement module 302 may determine to what degree the HMD unit 101 moves, how far it moves, in which direction it moves, and/or the like based on the sensor data, which may be used to determine whether the user is trying to look at content that is outside the user's field of view and to determine how to adjust the content to make it visible to the user.

In one embodiment, the calibration module 304 is configured to trigger re-calibrating the user's field of view relative to the display 102 of the HMD unit 101 in response to detecting that the user is attempting to look at content that is out of the user's field of view. For instance, the full display area may not be completely visible to the user because of an incorrect, incomplete, or erroneous calibration when the user first uses the HMD unit 101, which may cause the user's field of view to not correspond or match up with the viewport of the display 102. In such an embodiment, if it is determined that the user is straining to look at content that is not within the user's field of view, the calibration module 304 may trigger an automatic recalibration for the user, may prompt the user to confirm that the user would like to trigger a recalibration process, and/or the like.

Figure 4:
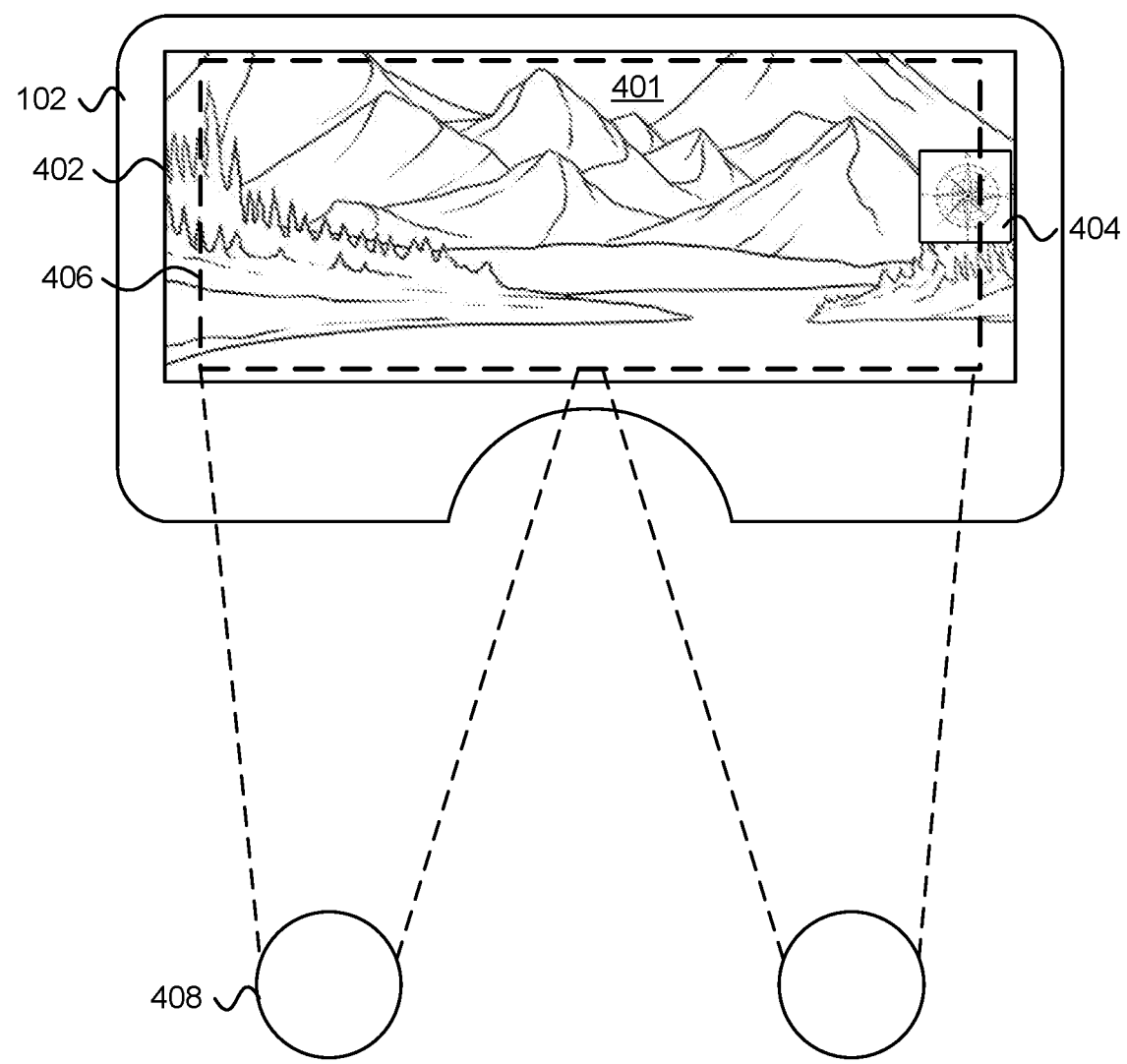
FIG. 4 is an illustration of an example embodiment of system for adjusting content of a head mounted display.

FIG. 4 depicts an example system for adjusting content of a head mounted display. In such an embodiment, content 401 is presented on a display 102 of an HMD unit 101. Other content elements may be presented on the display 102, including tag-along content 404 that "follows" the user, e.g., stays visible on the display 102, while the user moves his head, and the HMD unit 102.

While the user is wearing the HMD unit 101, the FOV module 202 may determine the user's field of view 406, based on the location of the user's eyes 408 relative to the display 102. If the user's field of view 406 does not match or correspond to the viewport 402 of the display 102, some content may not be visible to the user. In the depicted embodiment, the tag-along content 404, e.g., a compass in this example, is not fully visible to the user. If the gaze module 204 determines that the user is straining to look at the tag-along content 404 because it is at least partially out of the user's field of view 406, then the adjustment module 206 may perform various actions, described above, to adjust the tag-along content to make it visible to the user, e.g., to make it visible within the user's field of view 406.

Figure 5:
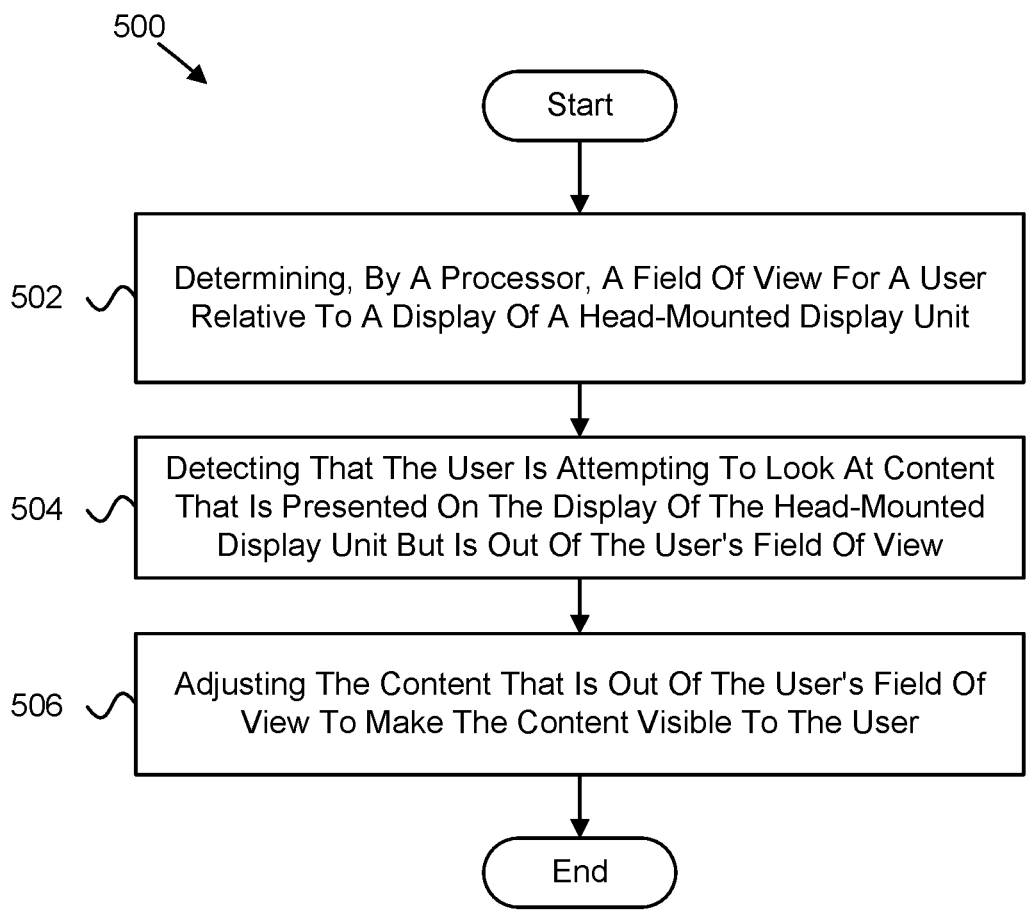
FIG. 5 is a schematic flow chart diagram illustrating one embodiment of a method for adjusting content of a head mounted display.

FIG. 5 is a schematic flow chart diagram illustrating one embodiment of a method 500 for adjusting content of a head mounted display. In one embodiment, the method 500 begins and determines 502 a field of view for a user relative to a display of a head-mounted display unit. In further embodiments, the method 500 detects 504 that the user is attempting to look at content that is presented on the display of the head-mounted display unit but is out of the user's field of view. In some embodiments, the method 500 adjusts 506 the content that is out of the user's field of view to make the content visible to the user, and the method 500 ends. In one embodiment, the FOV module 202, the gaze module 204, and the adjustment module 206 perform the various steps of the method 500.

Figure 6:
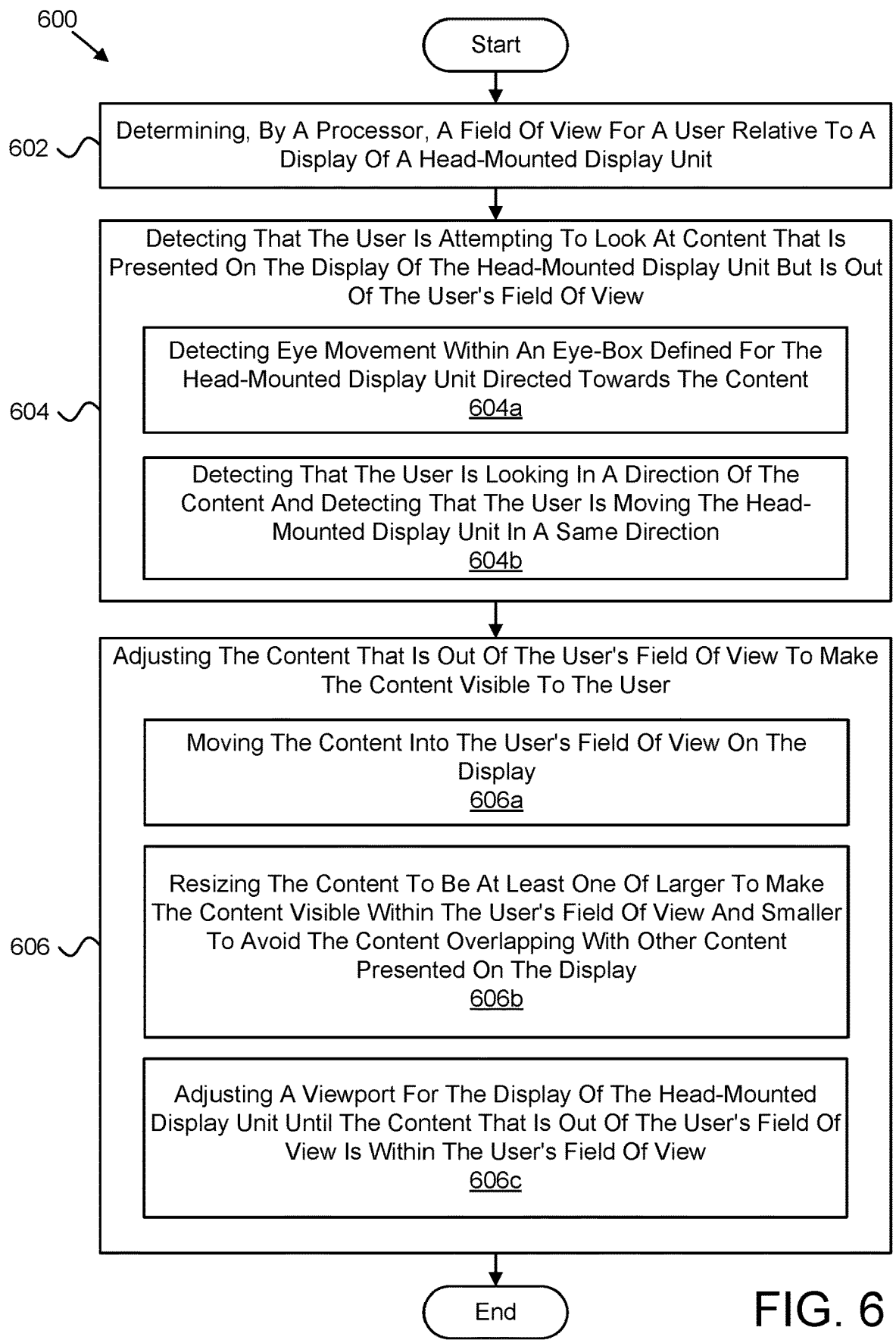
FIG. 6 is a schematic flow chart diagram illustrating one embodiment of another method for adjusting content of a head mounted display.

FIG. 6 is a schematic flow chart diagram illustrating one embodiment of another method 600 for adjusting content of a head mounted display. In one embodiment, the method 600 begins and determines 602 a field of view for a user relative to a display of a head-mounted display unit. In some embodiments, the method 600 detects 604 that the user is attempting to look at content that is presented on the display of the head-mounted display unit but is out of the user's field of view.

In such an embodiment, the method 600 may detect 604a that the user is attempting to look at content that is not within the user's field of view by detecting eye movement within an eye-box defined for the head-mounted display unit directed towards the content. In certain embodiments, the method 600 may detect 604b that the user is attempting to look at content that is not within the user's field of view by detecting that the user is looking in a direction of the content and detecting that the user is moving the head-mounted display unit in a same direction.

In further embodiments, the method 600 adjusts 606 the content that is out of the user's field of view to make the content visible to the user. In such an embodiment, the method 600 moves 606a the content into the user's field of view on the display. In further embodiments, the method 600 resizes 606b the content to be at least one of larger to make the content visible within the user's field of view and smaller to avoid the content overlapping with other content presented on the display. In various embodiments, the method 600 adjusts 606c a viewport for the display of the head-mounted display unit until the content that is out of the user's field of view is within the user's field of view, and the method 600 ends. In one embodiment, the FOV module 202, the gaze module 204, the adjustment module 206, and the movement module 302 perform the various steps of the method 600.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor; and
a memory that stores code executable by the processor to:
determine a field of view for a user relative to a display of a head-mounted display (HMD) unit, the field of view including first virtual content being displayed on the display;
detect that the user is attempting to look at second virtual content, wherein the second virtual content is outside the user's field of view and is not currently visible to the user; and
while maintaining the user's field of view and responsive to a change in the user's gaze, move the second virtual content that is outside the user's field of view and not visible to the user to within the user's field of view and visible to the user by moving the second virtual content that is outside the user's field of view from its current location outside the user's field of view and not visible to the user to within the user's field of view and visible to the user to allow the user to simultaneously view the first virtual content and the second virtual content in the user's field of view,
wherein the second virtual content that is moved to within the user's field of view does not block the first virtual content that is of interest to the user being displayed on the display within the user's field of view.

2. The apparatus of claim 1, wherein the code is executable by the processor to detect that the user is attempting to look at the second virtual content that is outside the user's field of view and not visible to the user by detecting eye movement within an eye-box defined for the HMD unit directed towards the second virtual content.

3. The apparatus of claim 2, wherein the code is executable by the processor to detect the eye movement within the eye-box based on input from a camera mounted on the HMD unit and pointed towards the user's eyes.

4. The apparatus of claim 2, wherein the code is executable by the processor to detect the eye movement within the eye-box based on input from a distance sensor mounted on the HMD unit and pointed towards the user's eyes.

5. The apparatus of claim 2, wherein the code is executable by the processor to detect the eye movement within the eye-box in response to detecting that the user is manually adjusting a position of the HMD unit on the user's head.

6. The apparatus of claim 1, wherein the code is executable by the processor to detect that the user is attempting to look at the second virtual content that is outside the user's field of view and not visible to the user by detecting that the user is looking in a direction of the second virtual content and detecting that the user is moving the HMD unit in a same direction.

7. The apparatus of claim 1, wherein moving the second virtual content further comprises resizing the second virtual content to be one of larger and smaller to avoid the second virtual content from overlapping with the first virtual content displayed on the display.

8. The apparatus of claim 1, wherein the second virtual content that is outside the user's field of view and not visible to the user comprises tag-along content.

9. The apparatus of claim 1, wherein the code is further executable by the processor to trigger re-calibrating the user's field of view relative to the display of the HMD unit in response to detecting that the user is attempting to look at the second virtual content that is outside the user's field of view and not visible to the user.

10. A method comprising:
- determining, by a processor, a field of view for a user relative to a display of a head-mounted display (HMD) unit, the field of view including first virtual content being displayed on the display;
- detecting that the user is attempting to look at second virtual content, wherein the second virtual content is outside the user's field of view and is not currently visible to the user; and
- while maintaining the user's field of view and responsive to a change in the user's gaze, moving the second virtual content that is outside the user's field of view and not visible to the user to within the user's field of view and visible to the user by moving the second virtual content from its current location outside the user's field of view and not visible to the user to within the user's field of view and visible to the user to allow the user to simultaneously view the first virtual content and the second virtual content in the user's field of view,
- wherein the second virtual content that is moved to within the user's field of view does not block the first virtual content that is of interest to the user being displayed on the display within the user's field of view.

11. The method of claim 10, wherein detecting that the user is attempting to look at the second virtual content that is outside the user's field of view and not visible to the user comprises detecting eye movement within an eye-box defined for the HMD unit directed towards the second virtual content.

12. The method of claim 11, further comprising detecting the eye movement within the eye-box based on input from a camera mounted on the HMD unit and pointed towards the user's eyes.

13. The method of claim 11, further comprising detecting the eye movement within the eye-box based on input from a distance sensor mounted on the HMD unit and pointed towards the user's eyes.

14. The method of claim 11, further comprising detecting the eye movement within the eye-box in response to detecting that the user is manually adjusting a position of the HMD unit on the user's head.

15. The method of claim 10, wherein moving the second virtual content further comprises resizing the second virtual content to be one of larger and smaller to avoid the second virtual content from overlapping with content displayed on the display.

16. A program product comprising a non-transitory computer-readable storage medium that stores code executable by a processor, the executable code comprising code to:
- determine a field of view for a user relative to a display of a head-mounted display (HMD) unit, the field of view including first virtual content being displayed on the display;
- detect that the user is attempting to look at second virtual content, wherein the second virtual content is outside the user's field of view and is not currently visible to the user; and
- while maintaining the user's field of view and responsive to a change in the user's gaze, move the second virtual content that is outside the user's field of view and not visible to the user to within the user's field of view and visible to the user by moving the second virtual content from its current location outside the user's field of view and not visible to the user to within the user's field of view and visible to the user to allow the user to simultaneously view the first virtual content and the second virtual content in the user's field of view,
- wherein the second virtual content that is moved to within the user's field of view does not block the first virtual content that is of interest to the user being displayed on the display within the user's field of view.

17. The program product of claim 16, wherein the executable code further comprises code to detect that the user is attempting to look at the second virtual content that is outside the user's field of view and not visible to the user by detecting eye movement within an eye-box defined for the HMD unit directed towards the second virtual content.

18. The program product of claim 16, wherein the executable code further comprises code to detect that the user is attempting to look at the second virtual content that is outside the user's field of view and not visible to the user by detecting that the user is looking in a direction of the second virtual content and detecting that the user is moving the HMD unit in a same direction.

19. The program product of claim 16, wherein moving the second virtual content further comprises resizing the second virtual content to be one of larger and smaller to avoid the second virtual content from overlapping with the first virtual content displayed on the display.

20. The program product of claim 16, wherein the executable code further comprises code to trigger re-calibrating the user's field of view relative to the display of the HMD unit in response to detecting that the user is attempting to look at the second virtual content that is outside the user's field of view and not visible to the user.

\* \* \* \* \*